United States Patent [19]
Okubo

[11] 4,339,780
[45] Jul. 13, 1982

[54] VIBRATION CONTROLLER UTILIZING MAGNETIC FORCES

[75] Inventor: Shigeo Okubo, Meno Park, Calif.

[73] Assignee: Design Professionals Financial Corp., San Francisco, Calif.

[21] Appl. No.: 205,845

[22] Filed: Nov. 10, 1980

[51] Int. Cl.³ .............................................. F16C 39/06
[52] U.S. Cl. ................................... 361/147; 361/146; 308/10
[58] Field of Search ....................... 361/146, 143, 147; 308/10; 318/460

[56] References Cited

U.S. PATENT DOCUMENTS

| | | | | |
|---|---|---|---|---|
| 2,856,238 | 10/1958 | Dacus | | 308/10 |
| 3,110,481 | 9/1958 | Kiverson | | 308/10 |
| 3,233,133 | 2/1966 | Kober | | 318/460 |
| 3,845,996 | 11/1974 | Geweke | | 308/10 |
| 4,091,687 | 5/1978 | Meinke | | 308/10 |
| 4,128,795 | 12/1978 | Habermann | | 318/621 |
| 4,244,629 | 1/1981 | Habermann | | 308/10 |

Primary Examiner—J. D. Miller
Assistant Examiner—L. C. Schroeder
Attorney, Agent, or Firm—Townsend and Townsend

[57] ABSTRACT

An apparatus for controlling vibration in a structural element includes a first magnet attached to the structural element, a sensing device positioned to detect motion of the structural element, and a vibration control device connected to receive information from the sensing device concerning motion of the structural element. The vibration control device includes a second magnet spaced apart from the first magnet and a coil for varying the magnetic field between the first magnet and the second magnet. The coil, in response to signals from the sensing device, alters the strength of the magnetic field and thereby controls vibration of the structural element.

12 Claims, 2 Drawing Figures

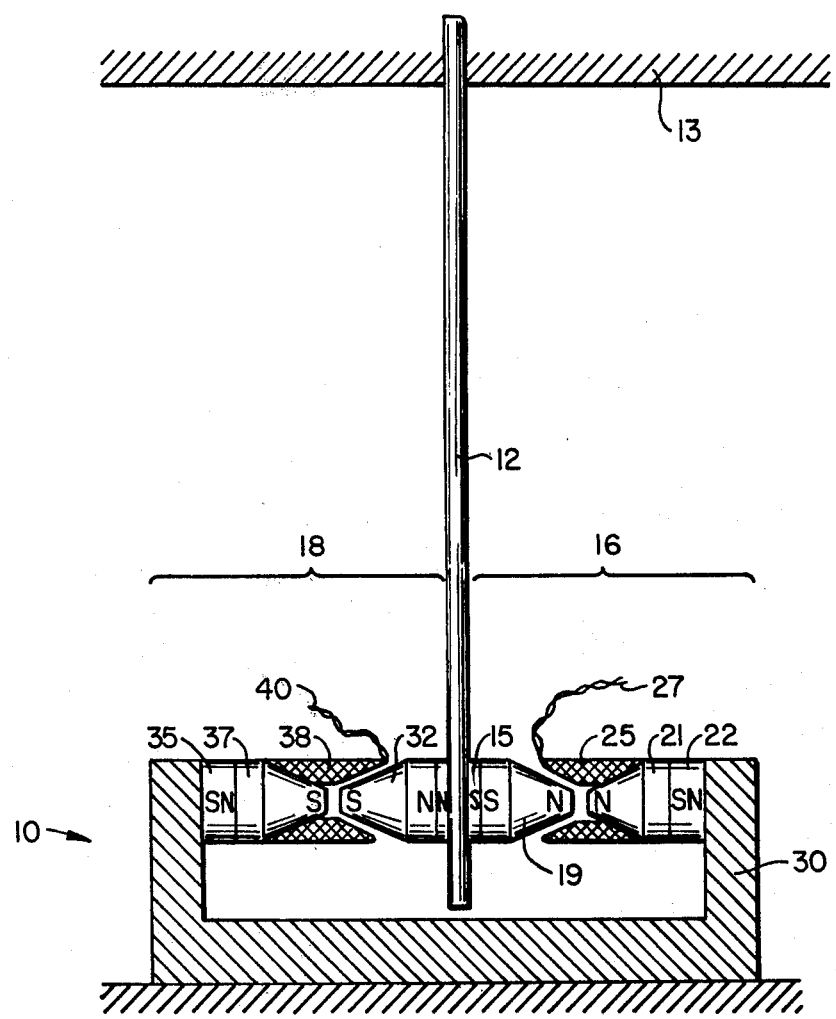
FIG._1.
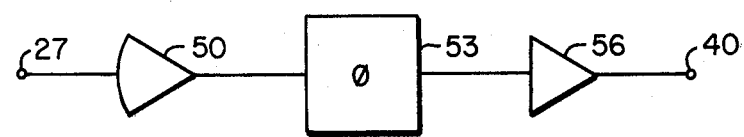
FIG._2.

VIBRATION CONTROLLER UTILIZING MAGNETIC FORCES

BACKGROUND OF THE INVENTION

1. Field of the Invention

This invention relates to the control of vibrations in structural elements, and in particular to a magnetic feedback control system for controlling or eliminating such vibrations.

2. Prior Art

Many servomechanisms are known which utilize feedback control to damp vibrations in structural members. Typically such systems have been mechanical or electromechanical and have therefore suffered from one or more disadvantages. For example, vibration controllers which depend upon relative motion between moving parts possess inherent mechanical resonances which must be accounted for, either by way of initial design considerations, or by the use of an output signal filtering device of some type. Some prior art devices are sensitive to more than one mode of vibration, or to a limited frequency range of vibration, and thereby provide measurement signals which contain other elements in addition to the vibrations sought to be controlled or eliminated. Other prior art devices involve delicate or expensive sensors and massive dampers or controllers.

Many types of controllers operate directionally, and therefore require that particular axes be carefully aligned for the device to function. Other prior art devices are temperature sensitive or require careful monitoring to provide correction signals related to temperature. Still other devices sense the vibration to be controlled at one location and then attempt to control it at another location therefore requiring careful positioning and/or calibration of the equipment involved.

SUMMARY OF THE INVENTION

This invention comprises a vibration controller which operates magnetically to control the vibration of the desired structural member. In one embodiment, the vibration sensor and the vibration controller are connected in a feedback arrangement to detect and control vibration of the structural member at a single location thereby making the detection and control independent of resonances in the structure. The invention is particularly useful in controlling vibrations in sensitive manufacturing operations, for example, photographic mask making for integrated circuits and production of electro-optical devices.

In one embodiment the invention comprises a first magnet attached to the structural element; sensing means disposed in proximity to the structural element for detecting motion of the first magnet; and vibration control means including: a second magnet spaced apart from the first magnet, and means for varying the strength of the magnetic field between the first magnet and the second magnet to thereby increase and decrease the magnetic force between the first magnet and the second magnet to control the vibration of the structural element.

In a typical embodiment the first magnet is attached to the structural element with opposing poles of the magnet projecting from opposite sides of the structural element. At least a portion of the space between the first magnet and the second magnet is surrounded by a torquing coil, which when energized, influences the strength of the magnetic field between the first magnet and the second magnet. Signals are supplied to the torquing coil from the sensing means with a phase appropriate to damp vibration in the structural element.

Typically, the sensing means includes a third magnet disposed in proximity to the first magnet, the space between the first magnet and third magnet being surrounded by a sensing coil for detecting changes in the strength of the magnetic field between the first magnet and the third magnet. Signals from this sensing means may be detected, amplified, and supplied to the vibration control means with the correct phase. In another embodiment two magnets are attached to the structural element. Motion of one of the two magnets is detected by the sensing means while an appropriate correcting force is applied to the other magnet.

Because in the preferred embodiment, neither the sensing means nor the vibration control means contains moving parts, there are no internal resonances to cause perturbations on the measurement signals or on the control signals. The simplicity of the design makes the sensing means and the vibration control means virtually noise free and temperature insensitive.

BRIEF DESCRIPTION OF THE DRAWING

FIG. 1 is a schematic view of one embodiment of the invention used to control vibrations in a structural element.

FIG. 2 is a schematic of a typical control circuit.

DETAILED DESCRIPTION

FIG. 1 is a schematic of one embodiment of the invention. Shown in FIG. 1 is a structural element 12 mounted in a rigid base 13. Structural element 12 may be any element in which vibration is to be controlled. For example, element 12 might be a spar in an aircraft wing with base 13 corresponding to the fuselage, or element 12 may be a support for an integrated circuit mask making apparatus. The invention may also be used to stabilize beam mounted optical equipment or test instruments, in aircraft control surfaces, accelerometers, or other applications where elimination or control of vibration is desired. Structural element 12 will tend to vibrate in a well known manner if time-varying loads are imposed upon it.

The vibration controller 10 in FIG. 1 is shown disposed about the tip of structural element 12 for illustrative purposes only. Controller 10 could be positioned anywhere along element 12, and element 12 may be of arbitrary shape and size. For example, in some embodiments element 12 might consist of a plurality of individual members connected together, the overall structure of which vibrates and is desired to be controlled. In other embodiments, element 12 may be rigidly or flexibly connected at each end with vibration controller 10 disposed somewhere along the unsupported length.

In the embodiment shown in FIG. 1 the vibration controller consists of a magnet 15 which is attached to element 12, a vibration sensing apparatus 16 and a vibration damping apparatus 18. Magnet 15 has north and south poles as shown in FIG. 1, although these poles may be reversed. The vibration sensing portion of the apparatus shown in FIG. 1 is primarily the apparatus in region 16, while the portion of the apparatus which applies correcting forces to damp the vibration is designated with the reference numeral 18. As will be evident either portion 16 or 18 may serve as either sensor or damper depending on the connections of leads 27 and 40.

Magnet 15 may be attached to element 12 in any well known manner. For example, in FIG. 1 magnet 15 is attached to element 12 through an opening (not shown) in element 12. Attached to the south pole of magnet 15 is a tapered iron pole piece 19 for producing a relatively high magnetic flux density across the space between pole piece 19 and pole piece 21 positioned on magnet 22. Pole pieces 19 and 21 may be held in place by the magnetic force from magnets 15 and 22, respectively, or may be otherwise attached. Disposed around the gap between pole piece 19 and pole piece 21 is a sensing coil 25 which is positioned in the magnetic field between the pole pieces. Coil 25 is connected by leads 27 to supply electrical signals to appropriate signal processing apparatus as will be described.

In operation, a disturbance of structural element 12 will change the strength of the magnetic flux between pole pieces 19 and 21 thereby inducing a current in coil 25. Appropriate signal processing apparatus connected to leads 27 will detect the signal from coil 25 and supply a correcting signal on leads 40 to torquing coil 38. The signal supplied to coil 38 will strengthen and weaken the magnetic field between pole piece 32 and pole piece 37 to thereby apply appropriate correcting forces to damp and/or eliminate vibration of element 12. In the embodiment shown, a rigid connector 30 connects the vibration damper 18 with the vibration sensor 16 to prevent differential movement between the two. Sensor 16 and damper 18 also can be mounted on other types of supports. To make the structure dynamically stable and to make the element 12 self-centering between sensor 16 and damper 18 the magnets 22 and 35 typically will be installed to repel the magnet 15. This embodiment is shown in FIG. 1.

In the preferred embodiment, vibration damper 18 is constructed in a similar manner to vibration sensor 16. That is, vibration damper 18 includes a tapered iron pole piece 32 magnetically adhered to magnet 15. Attached to magnet 35 in the damper 18 is a tapered iron pole piece 37. As in the vibration sensor 16, the tapered iron pole pieces 32 and 37 are used to concentrate the magnetic flux density between magnet 15 and magnet 35. Also similar to the vibration sensor 16, a coil 38 is disposed about the gap between pole piece 37 and pole piece 32. Coil 38, rather than detect a changing field as does coil 25, causes changes in the strength of the magnetic field between poles 32 and 37. Leads 40 are connected to coil 38 to receive electrical signals related to the motion of element 12.

Vibrations of structural element 12 will cause the gap between pole piece 19 and pole piece 21 to change, which thereby varies the reluctance of the magnetic path. This, in turn, causes the strength of the magnetic field passing through coil 25 to vary, which results in the generation of an electrical current proportional to the velocity of the vibration. The signals generated in coil 25 by the vibration are supplied by leads 27 to an external circuit shown in FIG. 2. Using well known signal processing techniques the signals on leads 27 are supplied to an operational amplifier 50 for detection. A phase control circuit 53, typically a resistor-capacitor filter, allows control of the phase of the signals to control damping of the vibration. A power amplifier 56 amplifies the output of the phase control 53 and supplies the amplified signals on leads 40 to coil 38. By feeding the signals from the amplifier to the torquing coil 25 with the proper phase, vibrations in element 12 may be damped and/or eliminated. In other embodiments of the invention wherein a constant rate of oscillation of element 12 is desired, for example, the phase of the signals supplied on leads 40 may be adjusted appropriately by adjusting phase controller 53.

The invention offers substantial advantages over prior art vibration controllers in that it operates independently of resonances in the structure because the vibration sensing and correcting torques are performed at the same location on the structure. In addition, the opposed magnet pairs act as magnetic springs to hold the structural element 12 in place.

Although one embodiment of the invention has been described and depicted, numerous variations may be made to such embodiment without departing from the scope of the invention as defined by the appended claims. For example, electromagnets may be used in place of permanent magnets, pole pieces of different shapes may be used if different magnetic flux densities or patterns are desired. The shape and location of the coil may be adjusted to increase or decrease the sensitivity of the sensor and/or damper by capturing more or fewer lines of magnetic flux extending between the pole pieces. The response of the system may be adjusted by changing the gap width between the pole pieces and the field strength. If desired the system may be used to induce desired vibrations rather than damp existing vibrations. This is readily accomplished by altering the phase of the signal supplied to the damper from the sensor.

What is claimed is:

1. Apparatus for controlling the vibration of a structural element comprising:
 a first magnet attached to the structural element;
 sensing means positioned to detect motion of the structural element including:
   a second magnet spaced apart from the first magnet, and
   means for detecting variations in the strength of the magnetic field between the first magnet and the second magnet; and
 vibration control means connected to receive information from the sensing means concerning the motion of the structural element, the vibration control means including:
   a third magnet spaced apart from the first magnet, and
   means for varying the strength of the magnetic field between the first magnet and the third magnet to increase and decrease the force between the first magnet and the third magnet to control the vibration of the structural element.

2. Apparatus as in claim 1 wherein the means for varying the strength of the magnetic field is a first coil.

3. Apparatus as in claim 2 wherein the first coil is disposed in the magnetic field between the first magnet and the third magnet.

4. Apparatus as in claim 3 wherein a pole piece is attached to one pole of each of the first magnet and the third magnet to thereby narrow the spacing between the first magnet and the third magnet to a first gap.

5. Apparatus as in claim 4 wherein the first coil surrounds the first gap between the pole pieces.

6. Apparatus as in claim 2 wherein:
 the sensing means supplies electrical signals related to vibration of the structural element to a signal processing means; and the first coil is connected to receive signals from the signal processing means.

7. Apparatus as in claim 1 wherein the means for detecting variations in the strength of the magnetic field between the first magnet and the second magnet is a second coil.

8. Apparatus as in claim 7 wherein the second coil is disposed in the magnetic field between the first magnet and the second magnet to generate electrical signals related to the magnetic field.

9. Apparatus as in claim 7 wherein a pole piece is attached to one pole of each of the first magnet and the second magnet to thereby narrow the spacing between the first magnet and the second magnet to a second gap.

10. Apparatus as in claim 9 wherein the second coil surrounds the second gap between the pole piece on the first magnet and the pole piece on the second magnet.

11. Apparatus as in claim 10 wherein electrical signals from the second coil are supplied to signal processing means and electrical signals from the signal processing means are supplied to the first coil.

12. Apparatus for controlling the vibration of a structural element comprising:
- a first magnet attached to the structural element;
- sensing means positioned to detect motion of the structural element including:
  - a second magnet spaced apart from the first magnet to thereby form a first gap, and
  - a first coil disposed about the first gap to detect variations in the strength of the magnetic field between the first magnet and the second magnet;
- signal processing means connected to the first coil to receive electrial signals therefrom; and
- vibration control means for controlling vibration in the structural element including:
  - a third magnet spaced apart from the first magnet to thereby form a second gap, and
  - a second coil disposed about the second gap and connected to the signal processing means to thereby increase and decrease the force between the first magnet and the third magnet to thereby control vibration of the structural element.

\* \* \* \* \*